Oct. 11, 1966 A. N. BELL ETAL 3,278,844
MEANS FOR MEASURING THE ELECTRICAL RESISTANCE
OF MOLTEN GLASS IN A TANK
Filed Aug. 22, 1962

INVENTORS
ALLEN N. BELL,
LOUIS H. GAUSS JR.
AND PAUL F. SPREMULLI
By Clarence R. Patty Jr.
ATTORNEY : 3,278,844
MEANS FOR MEASURING THE ELECTRICAL RESISTANCE OF MOLTEN GLASS IN A TANK
Allen N. Bell, Corning, Louis H. Gauss, Jr., Horseheads, and Paul F. Spremulli, Elmira, N.Y., assignors to Corning Glass Works, Corning, N.Y., a corporation of New York
Filed Aug. 22, 1962, Ser. No. 218,722
1 Claim. (Cl. 324—65)

This invention relates to means for measuring and controlling the electrical resistivities of fluid materials in situ.

Although, as will be apparent from the following description, the invention is useful in measuring and controlling the resistivities of all fluids, it will be described with reference to its utility in measuring the resistivity of molten glass in a furnace wherein the glass is heated by the passage of electrical current therethrough. It will be observed that the invention has particular utility in measuring the resistivities of molten materials in such furnaces.

The resistivity of molten glass is a function of both composition and temperature. If the temperature of molten glass in a forehearth is maintained constant, changes in resistivity are indicative of composition changes and can be utilized to detect and control such changes. In addition, for certain glass compositions, such as the borosilicates, variations in resistivity are indicative of changes in viscosity and may therefore be utilized in controlling variation in gob size.

Accordingly, it is an object of the present invention to provide means for measuring the electrical resistivity of both stationary and moving fluids at localized regions with minimum error due either to variations in fluid depth or to the effects of external electrical phenomena.

This and other objects, which will be apparent from the description, are accomplished by the provision of a shielded resistivity probe comprising three elements, a difference in electrical potential being maintained between a first of the elements and the remaining two, and the remaining two providing electrical shielding for the first.

Figure 1:
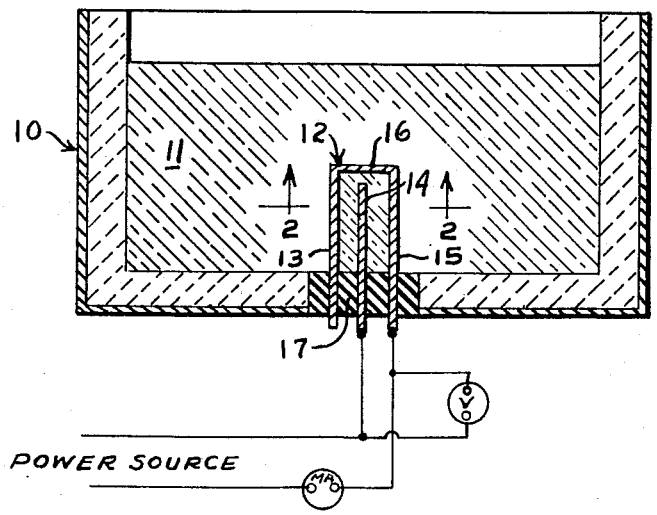
Figure 2:
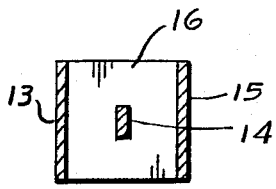

The invention will be described with reference to the accompanying drawing, in which:

FIG. 1 is a sectional view through a forehearth of a glass furnace and showing the probe of the invention, and FIG. 2 is an enlarged sectional view of the probe taken on line 2—2 of FIG. 1.

Referring to the drawing, there is illustrated in FIG. 1 forehearth 10 of a furnace for producing molten glass. The direction of flow of glass 11 is perpendicular to the plane of the paper in FIG. 1, and thus the glass flows between the elements of probe 12.

Probe 12 comprises parallel electrically conducting elements 13, 14 and 15, which pass through electrically insulating material 17 at the bottom of the forehearth and extend into the molten glass, and which may be constructed, for example, of molybdenum. In the illustrated embodiment elements 13 and 15 are connected by electrically conducting element 16. Elements 14 and 15 are connected, as illustrated, to the respective terminals of a source of electrical power. When power is applied, current flows between the two electrodes, which comprise respectively element 14 and elements 13, 15 and 16. The current flows through the electrically conducting molten glass in the gap between the electrodes, and a milliammeter is provided to measure the current passing therethrough, the current being proportional to the resistance of the circuit.

Elements 13 and 15 may have heights of 5 inches, and the widths of their opposed surfaces may be 2 inches, for example. Corresponding figures for element 14 are 3½ inches and ½ inch. Separations between the respective elements may be ½ inch, although these separations need not be equal.

Probe 12 is constructed to provide measurements which are independent of the depth of the fluid as well as of the dimensions of the forehearth. In addition, the probe is substantially insensitive to electrical currents passing through the molten glass other than that passing between the electrodes of the probe, thus permitting the forehearth to be heated by conventional electrical resistance heating methods.

Element 16, which connects elements 13 and 15, and which is preferably, although not necessarily, at the same distance from element 14 as are elements 13 and 15 renders the probe insensitive to changes in the depth of molten glass 11. This insensitivity is the result of the concentration of the electrical field within the probe. Lines of force which would otherwise fan out vertically toward the top of the forehearth are concentrated instead in element 16, which has a resistance very much less than that of the molten glass. Thus, in the presence of element 16, the electrical field does not extend to the surface of the molten glass and consequently is not influenced by variations in the level of this surface, which would otherwise alter the resistance path.

Although the presence of element 16 is preferable, this element may be omitted if the height of element 14 is small relative to that of elements 13 and 15. In the absence of connecting element 16, element 14 is preferably less than one-half the height of elements 13 and 15. By so limiting these relative dimensions, substantial extension of the electrical field produced by the probe above the tops of elements 13 and 15 is avoided. It will be apparent that when elements 13 and 15 are not electrically connected by means of element 16, it will be necessary independently to provide power to element 13.

When probe 12 is intended to remain stationary, the relative horizontal widths of the opposed surfaces of the elements are immaterial as long as elements 13 and 15 are at least as wide as element 14 in order to provide the necessary shielding; however, for reasons analogous to those noted in discussion of the depth sensitivity of the probe, when the distances between the probe and the sides of forehearth are to be varied, it is necessary, in order to avoid the necessity of recalibration, that the center element have a width substantially less than those of the opposed outer elements, as illustrated in FIG. 2, the ratio being preferably less than one-half.

When there exist ambient electrical currents, such as heating currents, in molten glass 11, it is necessary that the effects of these currents on the operation of probe 12 be minimized. If, for example, there existed a current traveling horizontally in the plane of the paper in FIG. 1, this current would contribute to that measured by the probe if the probe consisted merely of two unshielded electrodes. Since such ambient currents vary, the probe would appear to indicate changes in resistivity. To avoid this, probe 12 is constructed with the two outer elements 13 and 15, which comprise the outer electrode, positioned to provide an electrical shield for center element 14. Thus, any external electrical field parallel to the plane of the paper in FIG. 1 tends to flow through the outer electrode, and the result is that no potential is produced thereby between the inner and outer electrodes, and the only current flowing in the circuit results from the potential imposed between the electrodes. It will be understood that the outer electrode may extend further around the inner electrode or may, for example, comprise an electrically conductive mesh or other perforate structure completely surrounding the inner electrode, as long as sufficient path is provided through which the molten glass can flow continuously. The structure illustrated in the drawing provides minimum obstruction to the flow of the glass, while providing adequate shielding.

In order to provide a measurement of the average resistivity of the total amount of glass within the probe at any instant, probe 12 is preferably constructed such that center electrode 14 is equidistant from each of the elements 13, 15 and 16 of the outer electrode.

The probe of the illustrated embodiment, having a potential imposed between an inner element 14 and two substantially equidistant outer elements 13 and 15 is superior to a shielded two-element probe, inasmuch as any component of the external field which penetrates the shield will not show any substantial effect on the amount of current flowing through the probe. This is due to the fact that an external field having substantially parallel lines of force will add to the current passing between the center element and one of the outer elements the same amount that it will subtract from the current passing between the center element and the other outer element, since these two currents are in opposite directions.

Probe 12 is preferably although not necessarily supplied with an alternating electrical potential to prevent electrolysis of the solution by the probe current. Both to prevent such electrolytic action and to permit the filtering out of ambient electrical signals of known frequency, for example the 60 cycle current commonly used to heat the molten glass, a relatively high frequency power source is used. By way of example, but not by way of limitation, a preferred range may be from 400–1000 cycles per second. As means for indicating changes in the resistance of the glass passing through the probe, there has been illustrated the combination of a voltmeter and milliammeter. It will be understood that resistance may be measured directly by means of a Wheatstone bridge, the output of which may be used to regulate other variables such as temperature to maintain resistivity at a constant value.

It will be apparent to those skilled in the art that variations may be made within the scope of the present invention, and consequently it is intended that the invention be limited only by the scope of the appended claim.

What is claimed is:

Means for measuring the electrical resistivity of molten glass in a tank which comprises two electrodes, the first said electrode comprising a plate projecting upwardly from the bottom of said tank, the second electrode comprising first and second plates projecting upwardly from the bottom of said tank generally parallel to, and spaced on opposite sides of, said first electrode and joined by a third electrically conducting plate located between said first electrode and the top surface of said glass, said first electrode being located entirely between said first and second plates and entirely beneath said third plate, means for maintaining a difference in electrical potential between said electrodes, and means responsive to the passage of electrical current between said electrodes for indicating changes in the electrical resistance of the portion of said molten glass located between said electrodes.

References Cited by the Examiner
UNITED STATES PATENTS

| | | | |
|---|---|---|---|
| 1,882,316 | 10/1932 | Cleary | 317—246 |
| 2,349,992 | 5/1944 | Schrader | 324—65 |
| 2,904,751 | 9/1959 | Parsons | 324—61 |

WALTER L. CARLSON, *Primary Examiner.*

C. A. S. HAMRICK, *Assistant Examiner.*